United States Patent
Ibrahim et al.

(10) Patent No.: US 12,307,740 B2
(45) Date of Patent: *May 20, 2025

(54) TECHNIQUES TO PERFORM GLOBAL ATTRIBUTION MAPPINGS TO PROVIDE INSIGHTS IN NEURAL NETWORKS

(71) Applicant: Capital One Services, LLC, McLean, VA (US)

(72) Inventors: Mark Ibrahim, Brooklyn, NY (US); John Paisley, New York, NY (US); Ceena Modarres, Brooklyn, NY (US); Melissa Louie, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,349

(22) Filed: Mar. 8, 2024

(65) Prior Publication Data

US 2024/0355091 A1    Oct. 24, 2024

Related U.S. Application Data

(63) Continuation of application No. 17/990,050, filed on Nov. 18, 2022, now Pat. No. 11,928,853, which is a continuation of application No. 16/855,685, filed on Apr. 22, 2020, now Pat. No. 11,568,263.

(60) Provisional application No. 62/970,652, filed on Feb. 5, 2020.

(51) Int. Cl.
| | | |
|---|---|---|
| *G06V 10/762* | (2022.01) | |
| *G06F 18/23213* | (2023.01) | |
| *G06N 3/04* | (2023.01) | |
| *G06N 3/084* | (2023.01) | |

(52) U.S. Cl.
CPC ...... *G06V 10/763* (2022.01); *G06F 18/23213* (2023.01); *G06N 3/04* (2013.01); *G06N 3/084* (2013.01)

(58) Field of Classification Search
CPC .......... G06Q 10/0635; G06Q 20/4016; G06V 10/763; G06N 3/04; G06N 3/084; G06F 18/23213
See application file for complete search history.

(56) References Cited

U.S. PATENT DOCUMENTS 9,734,447 B1 *   8/2017   Diev ...................... G06N 5/045

OTHER PUBLICATIONS

Li et al. Credit Risk Assessment Algorithm using Deep Neural Networks with Clustering and Merging. (Year: 2017).*

* cited by examiner

*Primary Examiner* — Daniel G Mariam
(74) *Attorney, Agent, or Firm* — KDW FIRM PLLC

(57) ABSTRACT

Embodiments include techniques to determine a set of credit risk assessment data samples, generate local credit risk assessment attributions for the set of credit risk assessment samples, and normalize each local credit risk assessment attribution of the local credit risk assessment attributions. Further, embodiments techniques to compare each pair of normalized local credit risk assessment attributions and assign a rank distance thereto proportional to a degree of ranking differences between the pair of normalized local credit risk assessment attributions. The techniques also include applying a K-medoids clustering algorithm to generate clusters of the local risk assessment attributions, generating global attributions, and determining insights for the neural network based on the global attributions.

20 Claims, 12 Drawing Sheets

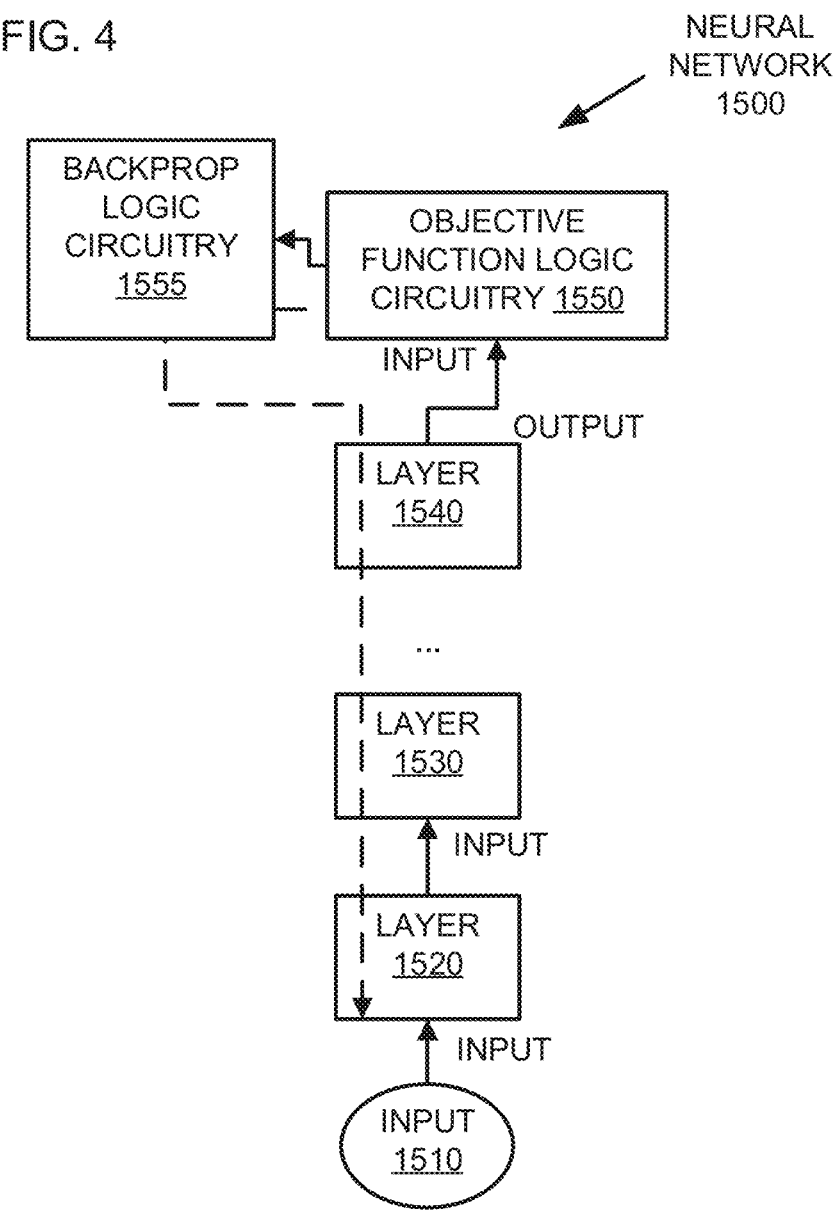

TECHNIQUES TO PERFORM GLOBAL ATTRIBUTION MAPPINGS TO PROVIDE INSIGHTS IN NEURAL NETWORKS

RELATED APPLICATIONS

This application is a continuation application of U.S. patent application Ser. No. 17/990,050, filed Nov. 18, 2022, now U.S. Pat. No. 11,928,853, which is a continuation of U.S. patent application Ser. No. 16/855,685, filed Apr. 22, 2020, now U.S. Pat. No. 11,568,263, which claims priority to U.S. Provisional Application No. 62/970,652, filed on Feb. 5, 2020, all entitled "TECHNIQUES TO PERFORM GLOBAL ATTRIBUTION MAPPINGS TO PROVIDE INSIGHTS IN NEURAL NETWORKS". The contents of the aforementioned applications are incorporated herein by reference in their entireties.

SUMMARY

Embodiments discussed herein may include systems and devices to perform operations to help interpret and predict neural network results. For example, embodiments may include determining a set of credit risk assessment data samples, generating local credit risk assessment attributions for the set of credit risk assessment samples. Moreover, each local credit risk assessment attribution includes a rank and a weight of an association between a particular feature and a particular prediction predicted by a neural network. Operations may further include normalizing each local credit risk assessment attribution of the local credit risk assessment attributions, comparing each pair of normalized local credit risk assessment attributions, and assigning a rank distance thereto proportional to a degree of ranking differences between the pair of normalized local credit risk assessment attributions. Operations also include applying a K-medoids clustering algorithm to generate clusters of the local risk assessment attributions. In embodiments, the K-medoids clustering algorithm utilizes the ranking distances for each pair of normalized local credit risk assessment attributions to assign each local credit risk assessment attribution to one of one or more clusters, and each cluster having a medoid. Operations further include generating global attributions, and determining insights including a bias in the neural network, one or more features to include in the neural network, or a combination thereof based on the global attributions.

BRIEF DESCRIPTION OF THE DRAWINGS

FIG. 4 illustrates an example configuration of a neural network system.

DETAILED DESCRIPTION

Figure 1A:
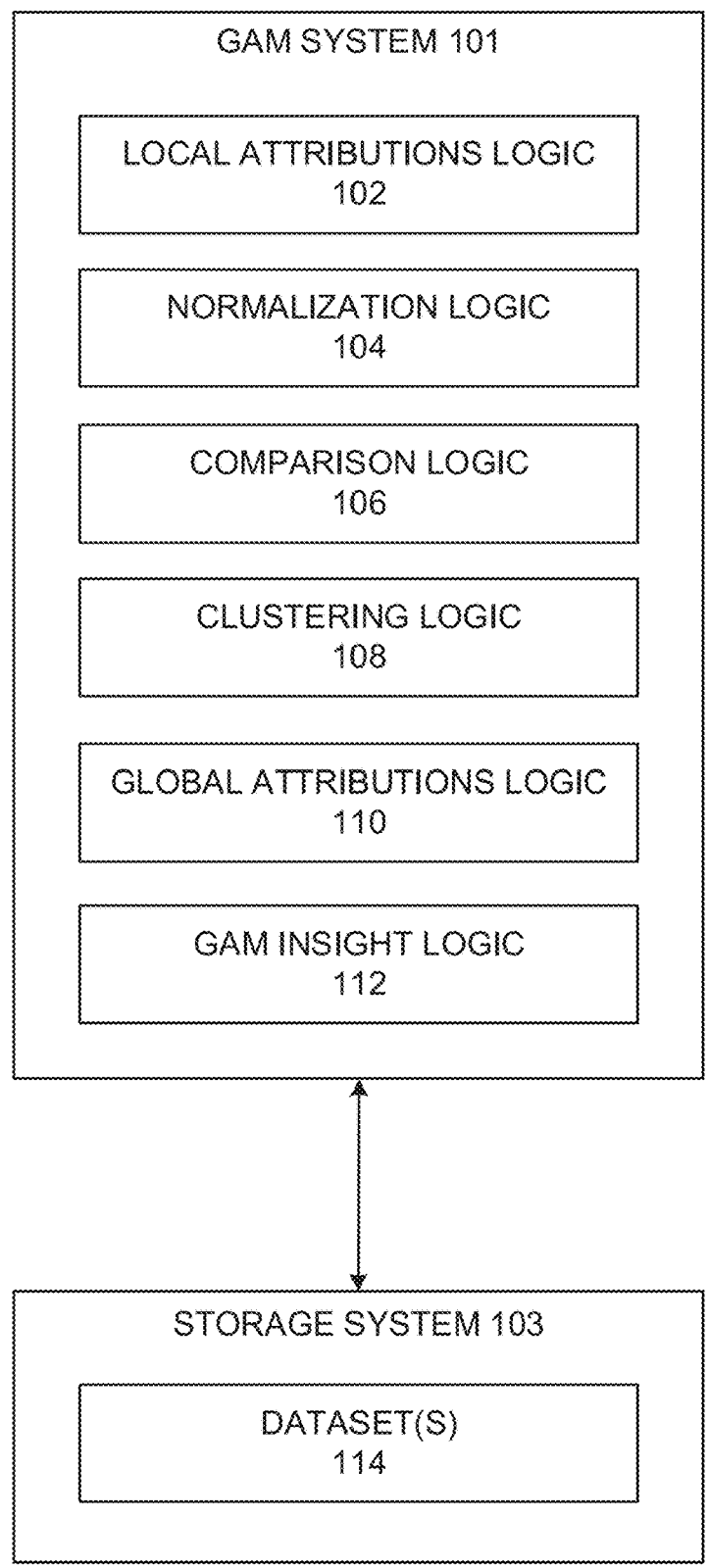
FIG. 1A illustrates an example configuration of a system to determine neural network insights via global attributions mappings (GAM).

Embodiments discussed herein describe techniques to interpret and predict neural network results. While current solutions include local explanation methods for one prediction, current global attributions still reduce neural network decisions to a single set of features. However, embodiments discussed herein disclose a global attribution mapping (GAM) approach for generating global attributions called GAM attributions. GAM processing techniques explain the landscape of neural network predictions across subpopulations. Moreover, GAM techniques augment global explanations with the proportion of samples that each attribution best explains and specifies which samples are described by each attribution. These global explanations have tunable granularity to detect more or fewer subpopulations. By utilizing GAM's global explanations, a system processing a neural network may determine feature importance of data, match feature weights of interpretable statistical models on real data and are intuitive to practitioners through user studies. With more transparent predictions, GAM techniques can help ensure neural network decisions are generated for the right reasons. The GAM techniques improve computing technologies process and interpret neural network processing and results. For example, the results of the GAM techniques may be fed back into a computer system to make adjustments in neural network processing to reduce bias, select certain features as inputs, and determine weights for features. Moreover, the embodiments discussed herein enable improvements to the technological field of artificial intelligence and neural networks by providing an interpretation of results that are intuitive to practitioners.

GAM techniques build on local attribution techniques. Embodiments discussed herein build on three local attribution technique including Locally Interpretable Model-Agnostic Explanations (LIME), integrated Gradients, and Deep Learning Important Features (DeepLIFT). LIME produces interpretable representations of complicated models by optimizing two metrics: interpretability and local fidelity. In processing, an input is perturbed by sampling in a local neighborhood to fit a simpler linear model. The linear model's weights can be used to interpret a particular model prediction. There is a global extension of LIME called Submodular Pick LIME (SP-LIME). SP-LIME reduces many local attributions into a smaller global set by selecting the least redundant set of local attributions. SP-LIME maximizes coverage defined as the total importance of the features in the selected global set. By contrast, the GAM techniques discussed herein utilize local attributions, determine rank distances between each of the local attributions, and then generate global attributions utilizing clustering techniques.

The Integrated Gradients utilizes an approach that satisfies two proposed axioms for attributions. First, sensitivity states that for any two inputs that differ in only a single feature and have different predictions, the attribution should be non-zero. Second, implementation invariance states that two networks that have equal outputs for all possible inputs should also have the same attributions. The Integrated Gradients approach takes the path integral of the gradient for a neutral reference input to determine the feature dimension with the greatest activation. An attribution vector for particular observation (local) is produced as a result.

Deep learning important features (DeepLIFT), much like integrated gradients, seeks to explain the difference in output between an input and a neutral reference. An attribution score is calculated by constructing a function analogous to a partial derivative that's used along with the chain rule to trace the change in the output layer relative to the input.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modifications, equivalents, and alternatives within the scope of the claims.

FIG. 1A illustrates a system 100 to provide global attribution insights using GAM techniques described herein. The illustrated system 100 includes a GAM system 101 coupled with a storage system 103. Embodiments are not limited to the illustrated system and components. For example, the GAM system 101 and storage system 103 may include additional components that are not illustrated in FIG. 1A, such as memory, processors, interfaces, interconnects, wireless and wired networking circuitry, and so forth.

In embodiments, the GAM system 101 may be configured to determine feature importance across a population of a data set to a neural network. A global explanation can provide advantages over current solutions, such as analyzing local attributions, to provide GAM insights such as aid in model diagnostics, uncover opportunities for feature engineering, and expose possible bias. Moreover, GAM techniques described herein explain nonlinear representations learned by neural networks across subpopulations. As will be discussed, GAM techniques group similar local feature importance to form interpretable global attributions. Each global attribution explains a particular subpopulation, augmenting global explanations with the proportion and specific samples they best explain. In addition, the GAM techniques provide tunable granularity to capture more or fewer subpopulations for global explanations. The GAM system 101 may analyze the GAM insights to make one or more decisions with respect to a neural network. For example, the GAM system may provide model diagnostics and bias to a user in a graphical user interface (GUI) on a display device, and a provide inputs to a feature input engineering system to select or deselect features for the neural network.

In embodiments, the GAM system 101 may be coupled with a storage system 103 storing one or more data sets 114. The storage system 103 may be any type of storage system, such as a database storage system, a cloud-based storage system, a distributed storage system, and so forth. In one example, the storage system 103 may store the data sets 114 in a data structure, such as a database. However, embodiments are not limited in this manner.

In embodiments, the GAM system 101 may include a number of components and logic configured to perform the operations discussed herein. For example, embodiments may include local attributions logic 102, normalization logic 104, comparison logic 106, clustering logic 108, global attributions logic 110, and GAM insight logic 112. In embodiments, the logic may be implemented as software stored in storage and executed by circuitry, such as one or more processors of the GAM system 101. Embodiments are not limited in this manner and in some instances, the logic may be implemented as a combination of software and hardware or hardware only. FIG. 1A discusses utilizing GAM techniques to generate GAM insights with respect to processing credit risk assessment data by a neural network. However, as discussed with respect to FIG. 1B and illustrated in FIGS. 2A-2D, embodiments discussed herein may apply to any number of data types.

The GAM system 101 may obtain a data set including a set of samples from storage, such as storage system 103, to perform a GAM analysis. The samples may include attributions and/or features. In one specific example, the samples may include a set of credit risk assessment data samples including credit risk assessment attributions and/or features.

The GAM system 101 including the components may process the samples and determine local attributions. For example, the GAM system 101 including the local attributions logic 102 may determine local credit risk assessment attributions from the set of credit risk assessment samples. Each of the local credit risk assessment attributions include a rank and a weight of an association between a particular feature and a particular prediction predicted by a neural network and each local attribution is a ranking of features. In embodiments, the local attributions logic 102 may utilize one of the previously discussed techniques to determine the local attributions including LIME, SP-LIME, Integrated Gradients, and DeepLIFT. However, embodiments are not limited in this manner and other known local attribution determination techniques may be used.

The local attribution logic 102 generates and processes each attribution as a vector in $R^n$: an attribution ranks and weighs each feature's association with a particular prediction. In embodiments, the local attribution logic 102 may determine an importance between a feature and a particular prediction by treating each attribution s a vector. The local attribution logic 102 processes attributions as weighted conjoined rankings to incorporate both the rank and weight encoded in an attribution. Moreover, the attributions are conjoined rankings because every feature appears in every attribution along the same dimension. As will be discussed in more detail below, the GAM system 101 may summarize the content of many local attributions by comparing their similarities to form the global attributions.

In embodiments, the GAM system 101 may normalize the local attributions and determine rank distances for the attributions. More specifically, the GAM system 101 includes normalization logic 104 to normalize the location attributions. In the credit risk assessment example, the normalization logic 104 may normalize each local credit risk assessment attribution of the local credit risk assessment attributions. More specifically, the normalization logic 104 may represent each attribution as a rank vector $\sigma$. The unweighted rank of feature i is $\sigma(i)$ and the weighted rank is $\sigma_w(i)$. The normalization logic 104, to ensure distances appropriately reflect similarity among vectors—as opposed to anomalies in the scale of the original inputs-normalize each local attribution vector $\sigma_w$ by equation 1.

$$|\sigma_w| \odot \frac{1}{\sum_i |\sigma_w(i)|}, \cdot \qquad \text{equation 1}$$

In equation 1, $\sigma_w$ is the weighted attribution vector and $\odot$ is the Hadamard product. By transforming the attribution into normalized percentages, the normalization logic 104 may focus on feature importance, and not whether a feature contributes positively or negatively to a particular target. The normalization logic 104 then can measure similarity among normalized attributions as weighted rankings of feature importance.

In embodiments, the GAM system 101 may compare, by the processing circuitry, each pair of normalized local credit risk assessment attributions, and assign a rank distance thereto proportional to a degree of ranking differences between the pair of normalized local credit risk assessment attributions.

The GAM system 101 may include comparison logic 106 to compare pairs of local attributions. In embodiments, the comparison logic 106 may utilize a statistical comparison technique to compare attributions. Two options may include a weighted Kendall's Tau and Spearman's Rho squared rank distances. With respect to the weighted Kendall's Tau rank distance, the comparison logic 160 can utilize a second attribution vector π and define the weighted Kendall's Tau distance between π and σ by equation 2.

$$\sum_{i<j} w_i w_j I\{(\pi(i) - \pi(j))(\sigma(i) - \sigma(j)) < 0\}, .$$ equation 2

In equation 2, $w_i = \pi_w(i)\sigma_w(i)$ and/is the indicator function. A feature weight, $w_i$, is the product of the w is the product of the weights in each ranking. Two rankings containing all elements in the same order (possibly different weights) have zero distance to imply the same feature importance. Two rankings with at least one element in a different order have a distance proportional to the out-of-order elements' weights. When a feature is ranked above or below in one ranking compared to the other, it is penalized by the product of its weights in the rankings. The total distance between the two rankings is then the sum of the penalty for feature appearing in a different order. The more features that appear in a different order, the greater the distance between the rankings. Further, the weighted Kendall's Tau distance described satisfies symmetry, positive definiteness, and sub-additivity meaning it defines a proper distance metric that the GAM system 101 can utilize for clustering rankings.

In a second example, the comparison logic 106 may utilize a weighted Spearman's Rho squared rank distance to perform a comparison for attributions, as defined by equation 3.

$$\sum_{i=1}^{k} \pi_w(i)\sigma_w(i)(\pi(i) - \sigma(i))^2, .$$ equation 3

The weighted Spearman's Rho squared rank distance, as defined in equation 3, compares attributions as weighted conjoined rankings with a runtime of O(n log n). Moreover, utilizing the weighted Spearman's Rho squared distance also defines a distance metric.

In embodiments, the comparison logic 106 may utilize one of the statistical comparison techniques over another for various reasons, such as computational run-time. For example, Kendall's Tau rank distance has computational and mathematical limitations. More specifically, Kendall's Tau has a quadratic runtime and can be computationally expensive as the number of features and/or samples grows in a data set. Also, Kendall's Tau tends to produce smaller values compared to Spearman's Rho, making differences between attributions less pronounced. Thus, the comparison logic 106 may determine to utilize Spearman's Rho in situations where the number of features and/or samples is large, the amount of time allotted to perform the computations, and the processing capabilities available, the comparison logic 106 may utilize Spearman's Rho squared rank distance techniques because it is a more effective alternative from a computational perspective and due to its ability to make differences among rankings more pronounced. A large sample may be one that can be processed within the allotted amount of time based on the processing capabilities available. For example, Spearman's Rho may utilized when amount of time to process the number of samples using Kendall's Tau is greater than the amount of time available based on the processing capabilities. However, Kendall's Tau rank distance techniques remains an appropriate choice when computational efficiency is less important due to its desirable statistical properties. For example, in some instances, the comparison logic 106 may utilize Kendall's Tau rank distance techniques because it has faster asymptotic convergence with respect to bias and variance. Once the GAM system 101 has defined metrics to compare attributions, embodiments include identifying similar attributions via a grouping technique.

In embodiments, the GAM system 102 includes clustering logic 108 to generate clusters or groupings of data points or local attributions. For example, the clustering logic 108 may apply a clustering algorithm, such as a K-medoids clustering algorithm, to generate clusters of the local risk assessment attributions. The clustering logic 108 may utilize the ranking distances for each pair of normalized local credit risk assessment attributions to assign each local credit risk assessment attribution to one of one or more clusters, and each of the clusters has a medoid.

Clustering algorithms can detect global patterns in a dataset by grouping similar data points into a cluster. The clustering logic 108 applies cluster in the context of local attribution vectors by transforming many local attributions into a few global attributions. The clustering logic 108 utilizes the weighted Kendall's Tau or Spearman's Rho squared rank distances to measure similarity among attributions. In one example, a previously discussed, the clustering logic 108 may apply the K-medoids clustering technique to use rank distance and then use the resulting medoids to summarize global attributions patterns.

In embodiments, the clustering logic 108 may apply the clustering algorithm to identify the K local attributions (medoids) minimizing the pairwise dissimilarity within a cluster relative to the medoid. The clustering logic 108 may utilize the medoid to summarize the pattern detected for each cluster. For example, the clustering logic 108, applying the clustering algorithm, initializes K local attributions (medoids) $m_1, \ldots, m_k$ selected randomly from the full set of local attributions. The local attributions are reassigned until convergence or for a sufficiently large number of iterations, each taking $O(n(n-K)^2)$. In some instances, the sufficiently large number interactions may be user selected. The choice of medoids at each iteration may be updated by the clustering logic 108 by determining cluster membership for each local attribution σ via the nearest medoid, where:

σ∈$C_a$ if rankDist(σ,$m_a$)≤rankDist(σ,$m_j$)∀$j$∈[1,K],
and updating each cluster's medoid by minimizing pairwise dissimilarity within a cluster, where:

$$m_a = \sigma_l = \mathrm{argmin}_{\sigma_l \in C_a} \sum_{\sigma_j \in C_a} rankdist(\sigma_j, \sigma_l).$$

In embodiments, the K-medoid clustering approach has advantages over other algorithms by allowing the GAM system 101 to compare attributions as conjoined weighted rankings rather than simply vectors in $R^a$. Moreover, the K-medoid cluster technique takes advantage of both the rank and weight information in local attributions during clustering. Each cluster specifies a subpopulation best explained by its medoid.

Algorithm 1, as found below, is one possible algorithm the GAM system 101 may apply to normalize local attributions, compute pair-wise rank distance matrix, and cluster attributions. However, embodiments are not limited to this specific algorithm and alternative approaches may be utilized to normalize local attributions, compute pair-wise rank distance matrix, and cluster attributions, and be consistent with embodiments discussed herein.

---

Algorithm 1: Generating Global Attributions (GAM)

---

Input: local attributions
Output: medoids and corresponding members
/* 1. Normalize the set of local
    attributions */ foreach local attribution do normalized =
    abs(attribution) / sum(abs(attribution)) end
/* 2. Compute pair-wise rank
    distance matrix */ distances = [ ]
foreach attribution1 in normalizedAttributions do
    foreach attribution2 in normalizedAttributions do
        distances += rankDistance(attribution1,
        attribution2) end
    end
/* 3. Cluster Attributions */ initialMedoids = random.choice
    (attributions)
for x iterations do
    foreach cluster do
        foreach attribution in cluster do tempMedoid = attribution;
            cost = sum(distance(attribution, tempMedoid));
                reassign medoid to attribution
                minimizing cost;
        end
        update cluster membership by assigning to
        closest medoid end
end

---

In embodiments, the GAM system 101 including the global attributions logic 110 may generate global attributions. For example, the global attributions logic 110 may generate global attributions, and each global attribution corresponds to one of the medoids of one of the clusters. Each of GAM's global explanations yields the most centrally located vector of feature importance for a subpopulation. The global attribution landscape described by GAM is then the collection of global explanations for each subpopulation.

The global attributions logic 110 may form GAM's global explanations across subpopulations by grouping similar normalized attributions. The global attributions logic 110 may gauge the explanatory power of each global attribution by the size of its subpopulation. Since GAM allows the GAM system 101 to trace a global explanation to individual samples, the GAM system 101 can determine GAM insights and can examine summary statistics for each subpopulation. In addition, by adjusting the cluster size K, the GAM system 101 can tune the granularity of global explanations to capture more or fewer subpopulations. In embodiments, the adjustment of the cluster size K may be performed by a user of the GAM system 101 or by the GAM system 101 itself. For example, the GAM system 101, as a starting point, may choose a K based a Silhouette score, which compares similarity within and across clusters.

In embodiments, the GAM system 101 identifies differences in explanations among subpopulations in contrast to global explanations via surrogate models, which produce a single global explanation. Furthermore, the ability to trace global explanations to individual samples supplements global explanations of techniques such as SP-LIME with information about subpopulations.

In embodiments, the GAM system 101 includes GAM insight logic 112 to determine and provide GAM insights based on the global explanations, as previously discussed above. For example, the GAM insight logic 112 may determine global explanations to individual samples, supplement other techniques, determine bias in the neural network, determine one or more features to include in the neural network, determine one or more features to remove in the neural network, determine subpopulations for which the neural network behaves unexpectedly, or a combination thereof based on the global attributions and explanations.

Figure 1B:
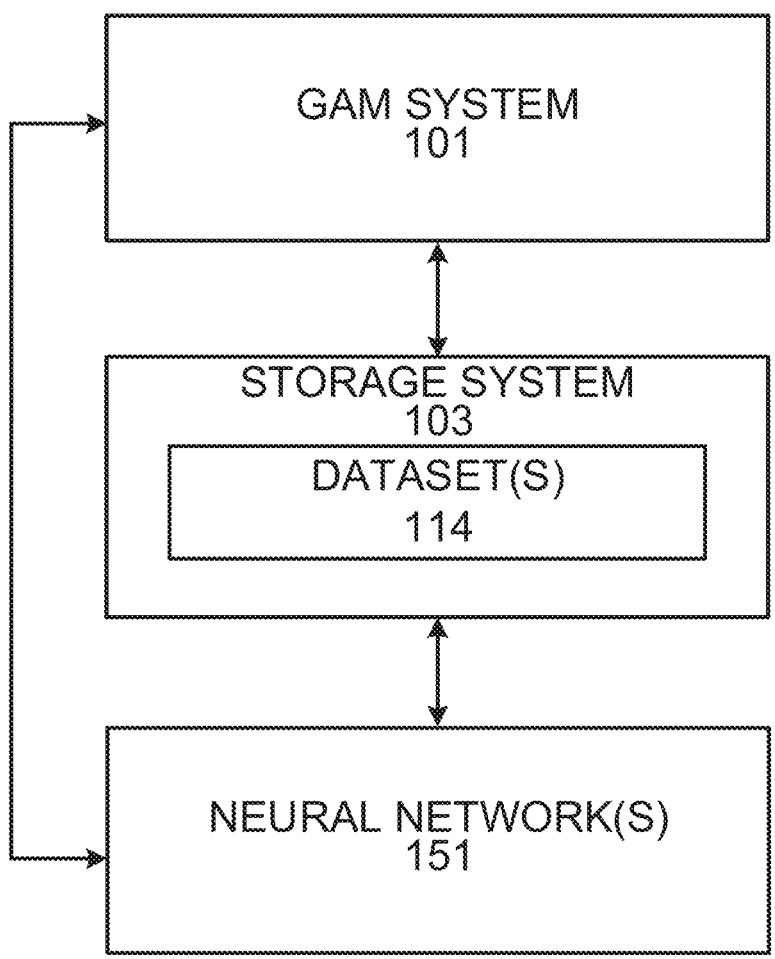
FIG. 1B illustrates an example configuration of a system to verify neural network insights.

FIG. 1B illustrates an example configuration of a system 150 to determine GAM insights. Further, the system 150 may be used to apply the above-described GAM techniques to a data set. The system 150 includes the GAM system 101, a storage system 103 including one or more data sets 114, and one or more neural networks 151. In embodiments, the data set 114 including a synthetic data set that may be used to validate the GAM techniques. In other instances, the data set 114 may include real-world data to apply the GAM technique.

In one example, the system 150 can be utilized to validate the Global Attributions technique using a synthetic data set. The data set may be generated by a user or by GAM system 101 to yield known feature importances against which to validate GAM's global attributions. The dataset includes a binary label, class 1 or 2, and two features, A and B. The data set may include one group for which only feature A is predictive and another group for which only feature B is predictive.

For the group where only feature A is predictive, the GAM system 101 may sample balanced classes from uniform distributions where:

$$\text{feature } A = \left\{ \begin{array}{l} U[0, 1], \text{ if class 1} \\ U[1, 2], \text{ if class 2} \end{array} \right\}.$$

To ensure feature B has no predictive power for this group, the GAM system 101 may draw from a uniform distribution over [0,2]. Further, since values for feature A in [0,1] mark class 1 and [1,2] mark class 2 samples, feature A has full predictive power. Feature B, on the other hand, is sampled uniformly over the same range for both classes, yielding no predictive power.

Conversely, to produce a group where only feature B is predictive, the GAM system 101 samples balanced classes where $$\text{feature } B = \left\{ \begin{array}{l} U[3, 4], \text{ if class 1} \\ U[4, 5], \text{ if class 2} \end{array} \right\}.$$

To ensure feature A has no predictive power for this group, the GAM system 101 may draw from a uniform distribution over [3,5].

In embodiments, the GAM system 101 may perform operations to validate the GAM techniques. For example, the GAM system 101 may conduct two tests. First, using a balanced set where feature A is predictive in 50% of cases and second using an unbalanced set where feature A is predictive in 75% of cases. The GAM system 101 may train a single layer feed forward neural network of neural networks 151 on a balanced dataset of 10,000 samples. The GAM system 101 may utilize a rectified linear unit (ReLU) activation function with a four-node hidden layer and a sigmoid output. The GAM system 101 hold out 2000 test samples and achieve a validation accuracy of 99%. The samples may be chosen at random in some instances.

In embodiments, the GAM system 101 may generate global attributions for the 2000 balanced test samples, as previously discussed. For example, the GAM system 101 may generate local attributions using a technique such as LIME. The GAM system 101 may also generate global attributions using GAM across several values of K. By computing the Silhouette Coefficient score, the GAM system 101 may find K=2 optimizes the similarity of attributions within the subpopulations. The GAM system 101 may obtain the corresponding size of the subpopulations and two explanation medoids summarizing feature importances (see Table 1).

TABLE 1

Global Attributions for Synthetic Data
Balanced

| Explanations | Subpopulation Size |
|---|---|
| $\begin{bmatrix} \text{feature } A: 0.93 \\ \text{feature } B: 0.07 \end{bmatrix}$ | 953 |
| $\begin{bmatrix} \text{feature } A: 0.05 \\ \text{feature } B: 0.95 \end{bmatrix}$ | 1047 |

For the balanced experiment, the global explanations and subpopulation proportions match expectations. The first subpopulation contains nearly half the samples and assigns a high importance weight to feature A. The second subpopulation contains the remaining half of samples and assigns a high importance weight to feature B.

For the unbalanced experiment, the global attributions contain two subpopulations with the expected proportions (see Table 2).

Unbalanced

| Explanations | Subpopulation Size |
|---|---|
| $\begin{bmatrix} \text{feature } A: 0.94 \\ \text{feature } B: 0.06 \end{bmatrix}$ | 1436 |
| $\begin{bmatrix} \text{feature } A: 0.13 \\ \text{feature } B: 0.87 \end{bmatrix}$ | 564 |

The first subpopulation assigns a high attribution to feature A and contains 72% of samples. The second subpopulation assigns a high attribution to feature B and contains 28% of samples, reflecting the feature importances inherent to the synthetic dataset. Overall, the global attributions produced by GAM system 101 match the known feature importance and proportions of both synthetic datasets.

In another example, the GAM system 101 applies the GAM techniques to a data set from data set(s) 114 include a large number of categorical features. In this example, the GAM system 101 may utilize the Audubon Society mushroom dataset. The GAM system 101 may classify mushroom samples as poisonous or not poisonous using 23 categorical features such as cap-shape, habitat, odor, and so on. In this example, the GAM system 101 applying the GAM techniques highlight the use of gradient-based neural network attribution techniques (DeepLIFT and integrated Gradients) to generate local attributions and compare the results against LIME. The GAM system 101 may choose the weighted Spearman's Rho squared rank distance to compare attributions for computational efficiency given the larger number of features and samples.

For the classification task, the GAM system 101 trains a two hidden-layer feed-forward neural network 151 on 4784 samples (withholding 2392 for validation). The GAM system 101 may encode the categorical features into a 128-unit input layer of the neural network 151. The network optimizes binary cross-entropy with dropout using sigmoid activation functions. The GAM system 101 obtains a validation accuracy of approximately 99%. The GAM system 101 may produce more accurate local attributions by minimizing inaccuracies due to model error.

In another example, the GAM system 101 applies GAM techniques on three sets of local attributions on 1000 samples using DeepLIFT, Integrated Gradients, and LIME. The GAM system 101 may identify three global explanations based on each technique. In this example, the top features did vary slightly in weight and rank depending on our choice of baseline (for DeepLIFT/Integrated Gradients). The GAM system 101 chooses the baseline yielding a nearly uniform classification output.

Figure 2A:
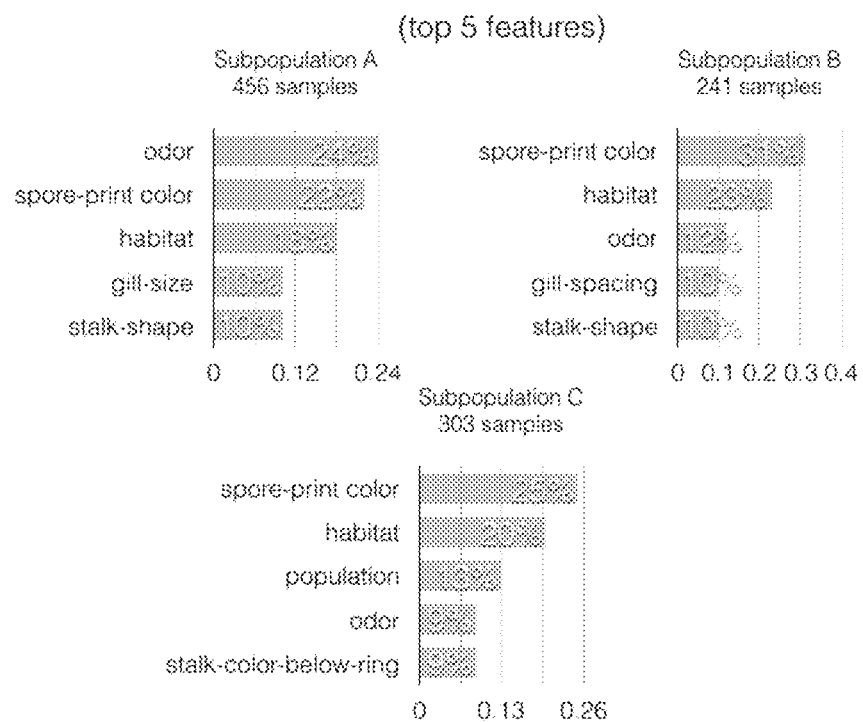
FIGS. 2A-2D illustrate example results for verifying GAM utilizing different data sets and local attribution techniques.

The global attributions based on DeepLIFT produce three subpopulations with similar top features, as illustrated FIG. 2A. FIG. 2A illustrates the five most important features for each global attribution explanation and the corresponding number of samples in each subpopulation. More specifically, in FIG. 2A, odor, habitat, and spore-print color appear among the top five features across all three subpopulations. Each subpopulation also surfaces distinctions in the relative feature importances. Spore-print color appears to be the most important features for 54% of samples, while odor is most important for the remaining subpopulation. Gill-size also appears to be relatively more important for subpopulation A, whereas gill-spacing is more so for subpopulation B. Despite slight variations in rankings, on average 8 out of the top 10 features agree across all three subpopulations, implying overall concordance in the surfaced top features.

Figure 2B:
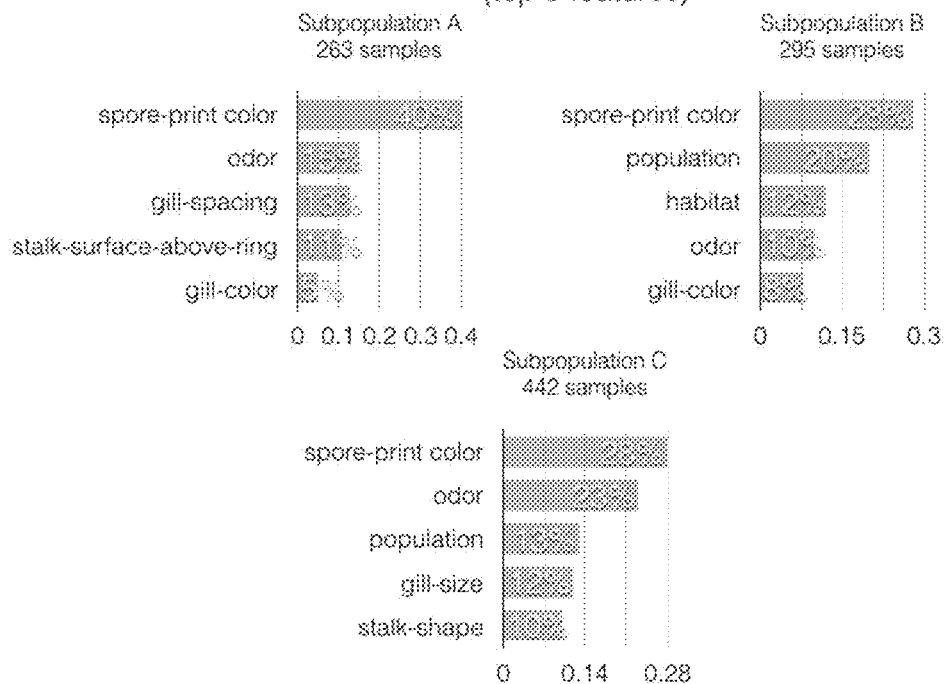

The global attributions based on Integrated Gradients also produce explanations ranking odor and spore-print-color among the top five features. FIG. 2B illustrates the utilization of Integrated Gradients and overlap among other top features such as habitat, population, and stalk-shape. Further, each subpopulation also surfaces nuances in the top features for each group. For example, the population is among the top 5 features for 74% of samples, whereas it's relatively less important for the remaining samples. Across all three subpopulations, however, on average 7 of the top 10 features agree, once again implying concordance in the top features.

Figure 2C:
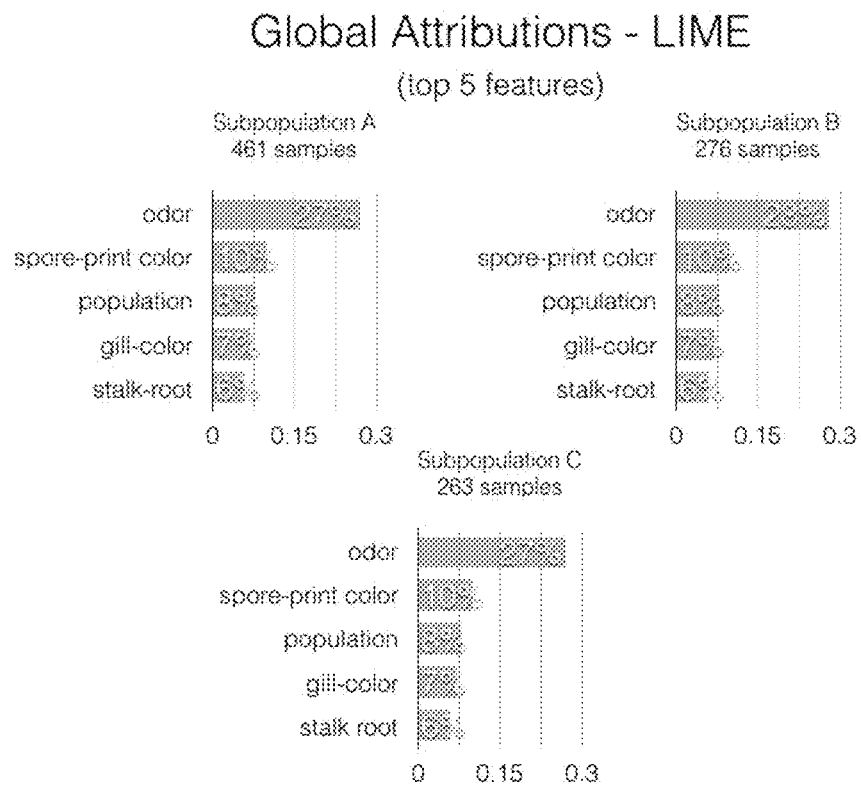

In addition, the results of the GAM techniques indicate that both gradient-based global attributions overlap in the top features for global attributions based on LIME. Global attributions for LIME also rank odor, spore-print-color, population, and gill-color among the top five features. As illustrated in FIG. 2C, the three subpopulations based on LIME produced similar top five features. Despite slight variations in rankings, all three local techniques surface similar most important features.

Figure 2D:
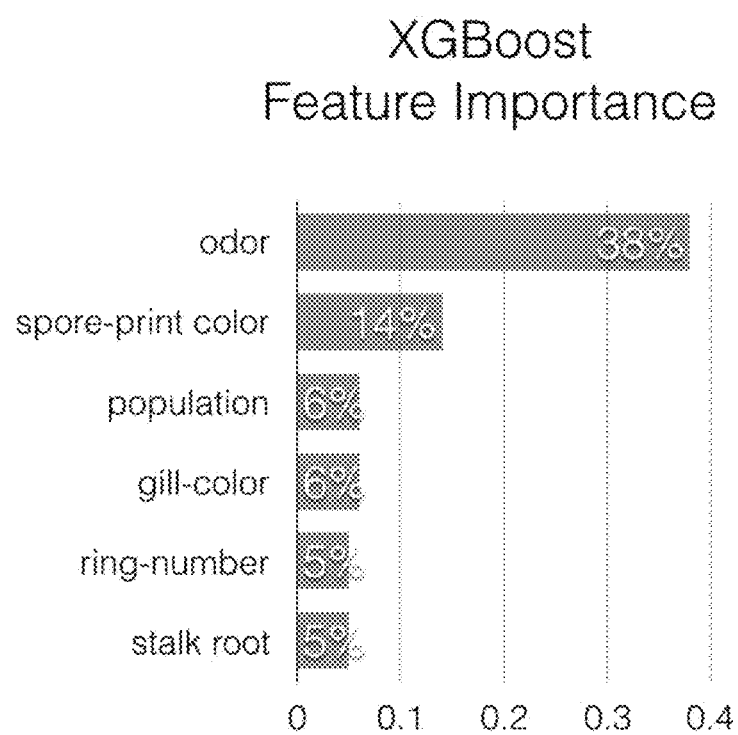

In embodiments, the GAM system 101 may validate global attributions across all three local techniques against the known feature importances of a gradient boosting tree classifier, as illustrated in FIG. 2D. The GAM system 101 may use a gradient booster framework, such as the XGBoost classifier and assign feature importances using each feature's F1 score. In this example, the GAM system 101 determines on average 7 out of the top 10 features in the global attributions across all three techniques match the top features of XGBoost. Odor, spore-print, population, gill-color, and stalk root appear among the most important features as illustrated in FIG. 2D. Furthermore, the weights of the top features of XGBoost match closely the weights of global attributions based on LIME. Although global XGBoost feature importances corroborate the most important features surfaced, the findings may be qualified by noting that two equally performing models can learn a different set of feature interactions. Nevertheless, in this examples the global attributions' similarity to known global feature importances across multiple local techniques suggests the explanations generated effectively uncover associations among features and the classification task.

In another example, the GAM system 101 applies the GAM techniques to a data set 114 including FICO Home Equity Line Credit applications. The data set 114 provides information on credit candidate applications and risk outcomes characterized by 90-day payment delinquencies.

In this example, the GAM system 101 may be utilized to simulate a scenario to conduct feature selection. For example, the GAM system 101 may select seven predictive features and add in three additional uniformly distributed noise features. The GAM system 101 may further process the data set by dropping all feature names. The GAM system 101 may train a neural network to make credit decisions, produce a GAM model explanation, and present the explanation to users. More specifically, the GAM system 101 may present the explanations, such as those illustrated in FIGS. 2A-2D, in a GUI interface on a display in the form of a bar chart. Users may interact with the GUI interface to manipulate the explanation, e.g., select and remove a number of least important features.

Figure 3A:
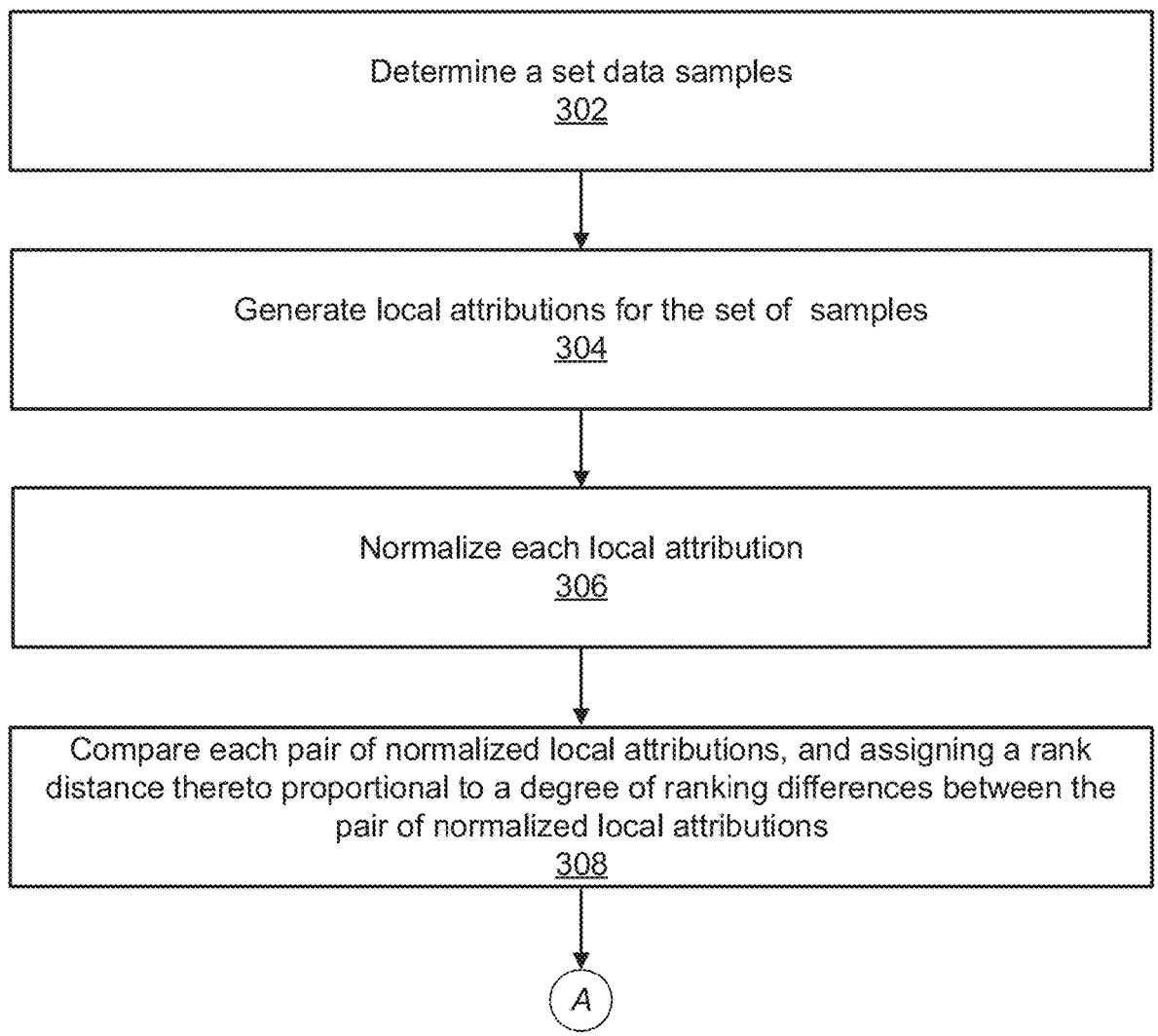
FIGS. 3A/3B illustrate an example logic flow.
Figure 3B:
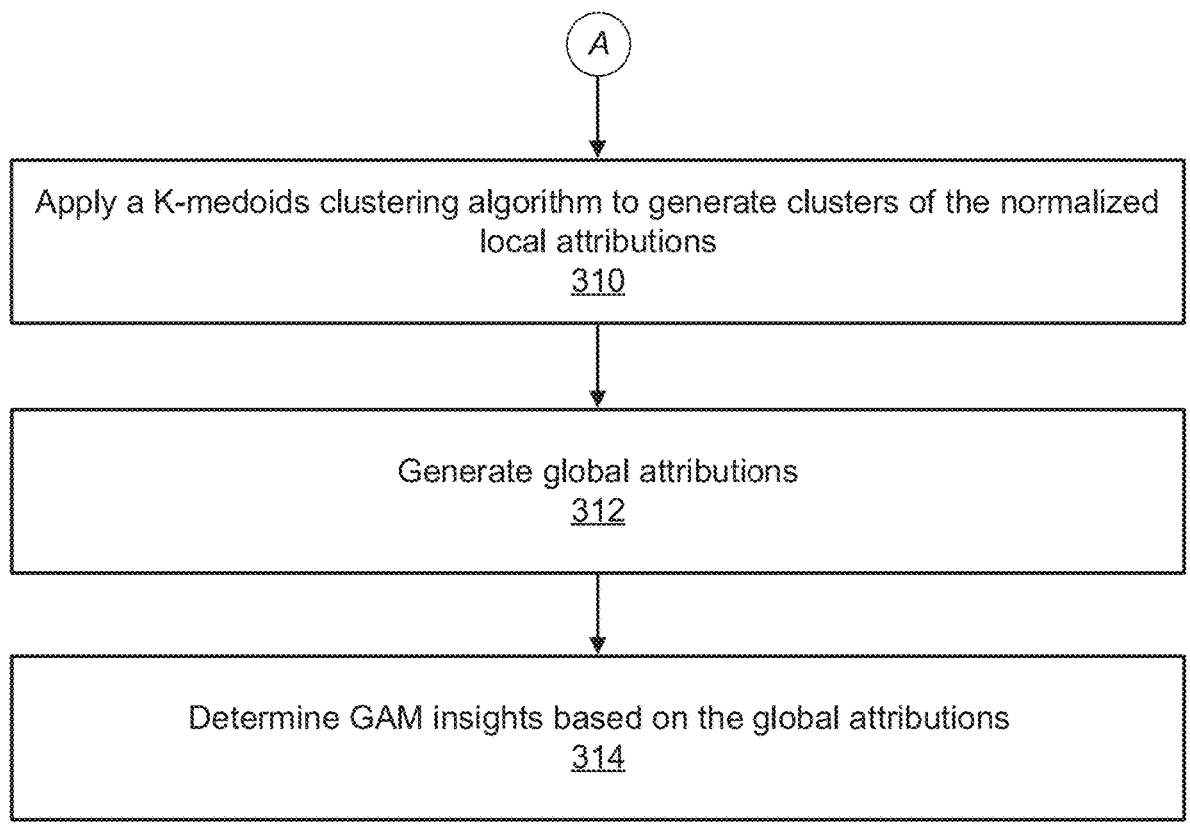

FIGS. 3A/3B illustrates an example of a logic flow 300 that may be representative of GAM techniques to generate GAM insights. The logic flow 300 may be representative of operations that may be performed in various embodiments by any constituent components of the GAM system 101 depicted in FIGS. 1A/1B.

The logic flow 300 may include determining a set of data samples from a data set at block 302. In one example, the GAM system 101 may retrieve data samples including credit risk assessment data samples from storage 103.

The logic flow 300 includes generating local attributions at block 304. More specifically, the GAM system 101 may generate local credit risk assessment attributions for the set of credit risk assessment samples. Further, each local credit risk assessment attribution includes a rank and a weight of an association between a particular feature and a particular prediction predicted by a neural network. In embodiments, the GAM system 101 may utilize a technique such as LIME, SP-LIME, Integrated Gradients, and DeepLIFT to determine the local attributions.

In embodiments, the logic flow 300 includes normalizing each local attribution at block 306. For example, the GAM system 101 may normalize the local credit risk assessment attributions by representing each attribution as a rank vector σ. The unweighted rank of feature i is σ(i) and the weighted rank is $\sigma_w(i)$. The GAM system 101 may ensure distances appropriately reflect similarity among vectors and normalize each local attribution vector $\sigma_w$ by equation 1.

At block 308, the logic flow 300 includes comparing each pair of normalized local attributions and assigning a rank distance thereto proportional to a degree of ranking differences between the pair of normalized attributions. More specifically, the GAM system 101 may utilize a statistical comparison technique to compare attributions, such as the normalized credit risk assessment attribution. The comparison technique may be the weighted Kendall's Tau rank distance or the Spearman's Rho squared rank distance.

The logic flow 300 may include applying a K-medoids clustering algorithm to generate clusters of the attributions at block 310. More specifically, the GAM system 101 applying the K-medoids clustering algorithm utilizes the ranking distances for each pair of normalized local credit risk assessment attributions to assign each local credit risk assessment attribution to one of one or more clusters, and each cluster having a medoid.

In embodiments, at block 312, the logic flow 300 includes generating global attributions, and each global attribution corresponds to one of the medoids of one of the clusters. At block 314, the logic flow 300 includes determining a GAM insight such as a bias in the neural network, one or more features to include in the neural network, or a combination thereof based on the global attributions.

FIG. 4 depicts an embodiment of a neural network 1500 of a credit risk assessment system. Specifically, FIG. 4 depicts an embodiment of stages of the neural network (NN) 1500 such as a recurrent neural network (RNN).

An RNN is a class of artificial neural network where connections between nodes form a directed graph along a sequence. This allows the RNN to exhibit dynamic temporal behavior for a time sequence. RNNs can use their internal state (memory) to process sequences of inputs and can have a finite impulse structure or an infinite impulse structure. A finite impulse recurrent network is a directed acyclic graph that can be unrolled and replaced with a strictly feedforward neural network, while an infinite impulse recurrent network is a directed cyclic graph that cannot be unrolled. A feedforward neural network is a neural network in which the output of each layer is the input of a subsequent layer in the neural network rather than having a recursive loop at each layer.

The neural network 1500 illustrates an embodiment of a feedforward neural network, but other embodiments may utilize other RNNs or other types of NNs. The neural network 1500 comprises an input layer 1510, and three or more layers 1520 and 1530 through 1540. The input layer 1510 may comprise input data that is training data or samples for the neural network 1500 or new credit risk assessment data. The input layer 1510 may provide the credit risk assessment data in the form of tensor data to the layer 1520. The credit risk assessment data may include transaction information, debt information, credit history information, and other data relating to a purchase on credit by a customer.

In embodiments, the input layer 1510 is not modified by backpropagation. The layer 1520 may compute an output and pass the output to the layer 1530. Layer 1530 may determine an output based on the input from layer 1520 and pass the output to the next layer and so on until the layer 1540 receives the output of the second to last layer in the neural network 1500. For embodiments with RNNs that are not feedforward (not shown), each layer may recursively compute an output based on the output of the layer being fed back into the same layer as an input.

The layer 1540 may generate an output and pass the output to an objective function logic circuitry 1550. The objective function logic circuitry 1550 may determine errors in the output from the layer 1540 based on an objective function such as a comparison of the expected output against the actual output. For instance, the expected output may be paired with the input in the training data supplied for the neural network 1500 for supervised training. In one example, during training, the probability output of the objective function logic circuitry 1550 should be less than a probability threshold if the training data is known, selected, or synthesized to represent typical behavioral patterns of customers and credit risks.

During the training mode, the objective function logic circuitry 1550 may output errors to backpropagation logic circuitry 1555 to backpropagate the errors through the neural network 1500. For instance, the objective function logic circuitry 1550 may output the errors in the form of a gradient of the objective function with respect to the parameters of the neural network 1500.

The backpropagation logic circuitry 1555 may propagate the gradient of the objective function from the top-most layer, layer 1540, to the bottom-most layer, layer 1520 using the chain rule. The chain rule is a formula for computing the derivative of the composition of two or more functions. That is, if f and g are functions, then the chain rule expresses the derivative of their composition f∘g (the function which maps x to f(g(x))) in terms of the derivatives of f and g. After the objective function logic circuitry 1550 computes the errors, backpropagation logic circuitry 1555 backpropagates the errors. The backpropagation is illustrated with the dashed arrows.

Figure 5:
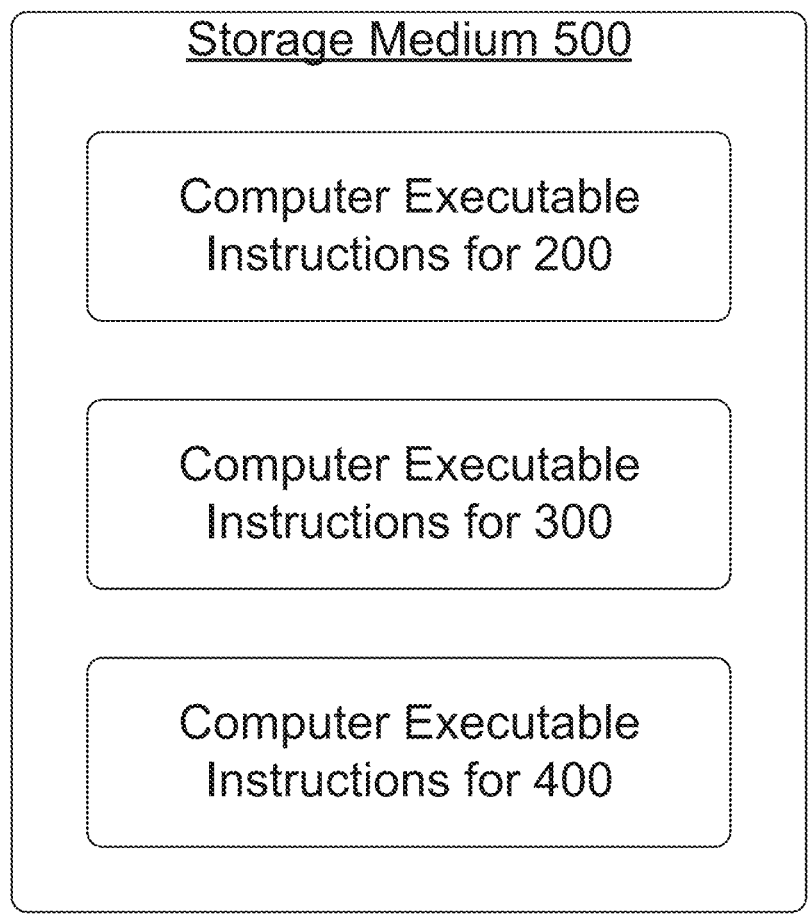
FIG. 5 illustrates an example of a storage medium.

FIG. 5 illustrates a storage medium 500. Storage medium 500 may represent an implementation of a system or computing device of the GAM system 100 including any electronic device and/or computing device that may operate as a node within the a GAM system 100. The storage medium 500 can comprise any non-transitory computer-readable storage medium or machine-readable storage medium. In various embodiments, the storage medium 500 can comprise a physical article of manufacture. In various embodiments, storage medium 500 can store computer-executable instructions 550, such as instructions to implement one or more of logic flows or operations described herein, including logic flow 300 of FIGS. 3A/3B, and neural networking 1500 processing of FIG. 4. In various embodiments, storage medium 500 can store computer-executable instructions, such as computer-executable instructions to implement any of the functionality described herein in relation to any described device, system, or apparatus. Examples of a computer-readable storage medium or machine-readable storage medium can include any tangible media capable of storing electronic data. Examples of computer-executable instructions can include any type of computer readable code.

Figure 6:
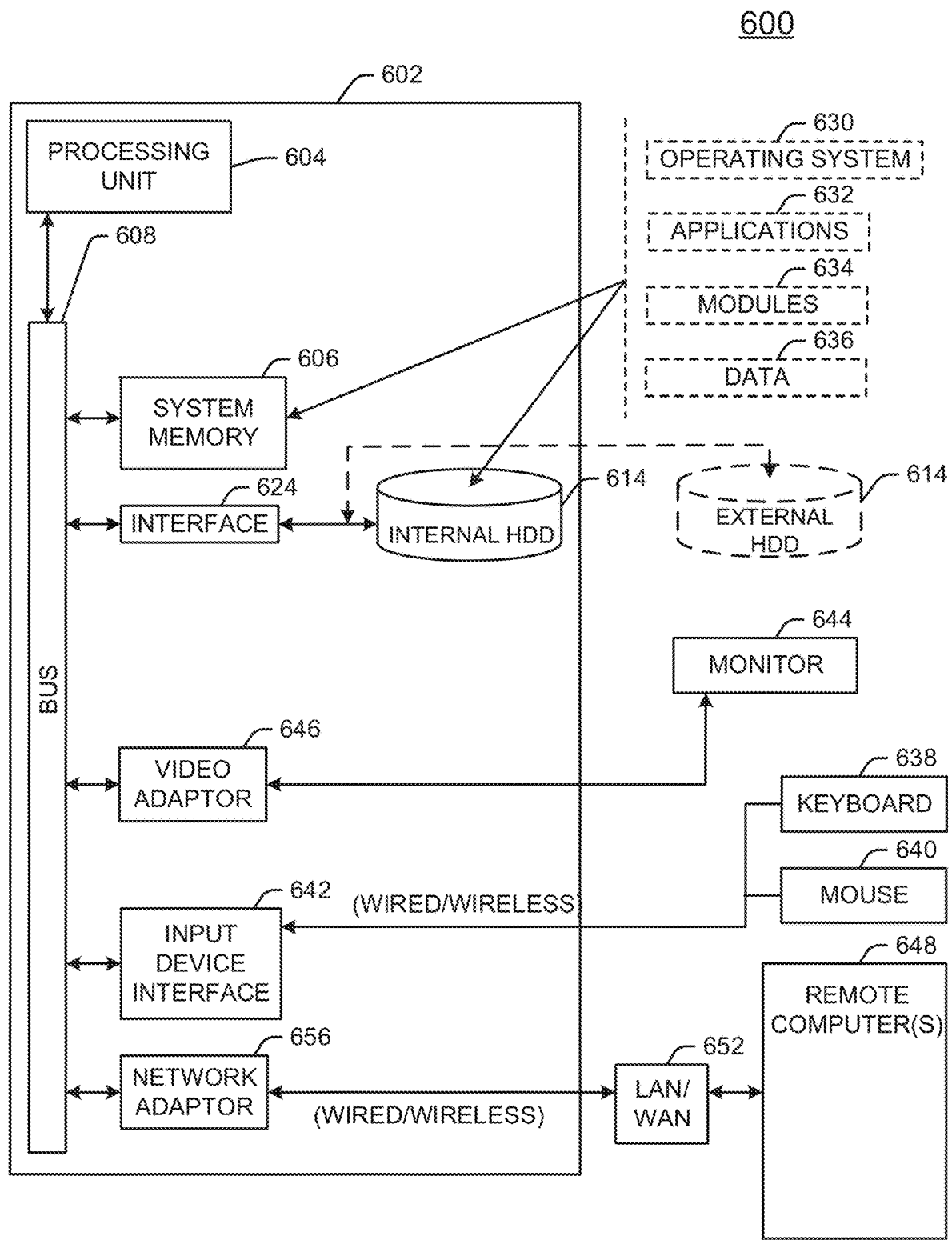
FIG. 6 illustrates an example of a system architecture.

FIG. 6 illustrates a computing architecture 600 that can implement various embodiments described herein. In various embodiments, the computing architecture 600 can comprise or be implemented as part of an electronic device and/or a computing device. In various embodiments, the computing architecture 600 can represent an implementation of any constituent component of the mesh network 100 depicted in FIG. 1. One or more of the constituent components of the computing architecture 600, and/or any constituent component of the mesh network 100, can be implemented in hardware, software, or any combination thereof including implementation based on a storage device (e.g., a memory unit) and logic, at least a portion of which is implemented in circuitry and coupled to the storage device. The logic can be or can include a processor or controller component.

The computing architecture 600 can include various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth.

As shown in FIG. 6, the computing architecture 600 can comprise a computer 602 having a processing unit 604, a system memory 606 and a system bus 608. The processing unit 604 can be any of various commercially available processors or can be a specially designed processor.

The system bus 608 provides an interface for system components including, but not limited to, an interface between the system memory 606 and the processing unit 604. The system bus 608 can be any of several types of bus structure that may further interconnect to a memory bus (with or without a memory controller), a peripheral bus, and a local bus using any of a variety of commercially available bus architectures.

The system memory 606 can include any type of computer-readable storage media including any type of volatile and non-volatile memory. The computer 602 can include any type of computer-readable storage media including an internal (or external) hard disk drive (HDD) 614. In various embodiments, the computer 602 can include any other type of disk drive such as, for example, a magnetic floppy disk and/or an optical disk drive. The HDD 614 can be connected to the system bus 608 by an HDD interface 624.

In various embodiments, any number of program modules can be stored in the drives and memory units 606 and/or 614 such as, for example, an operating system 630, one or more application programs 632, other program modules 634, and program data 636.

A user can enter commands and information into the computer 602 through one or more wired/wireless input devices such as, for example, a keyboard 638 and a pointing device, such as a mouse 640. These and other input devices can be connected to the processing unit 604 through an input device interface 642 that is coupled to the system bus 608. A monitor 644 or other type of display device can also be connected to the system bus 608 via an interface, such as a video adaptor 646. The monitor 644 may be internal or external to the computer 602.

The computer 602 may operate in a networked environment using logical connections via wired and/or wireless communications to one or more remote computers, such as a remote computer 648. The remote computer 648 can be a workstation, a server computer, a router, a personal computer, portable computer, microprocessor-based entertainment appliance, a smartphone, a tablet, a peer device or other common network node, and typically includes many or all of the elements described relative to the computer 602. The logical connections depicted include wired and/or wireless connectivity to networks 652 such as, for example, a local area network (LAN) and/or larger networks, for example, a wide area network (WAN). Networks 652 can provide connectivity to a global communications network such as, for example, the Internet. A network adapter 656 can facilitate wired and/or wireless communications to the networks 652. The computer 602 is operable to communicate over any known wired or wireless communication technology, standard, or protocol according to any known computer networking technology, standard, or protocol.

Figure 7:
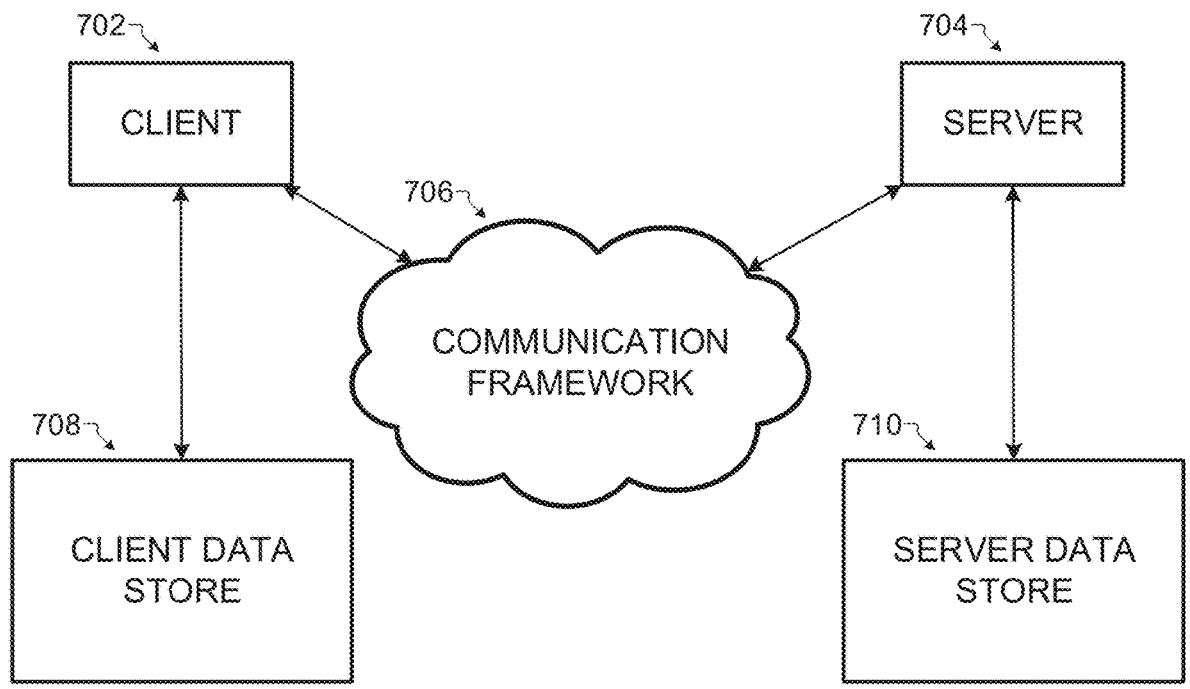
FIG. 7 illustrates an example of a communication architecture.

FIG. 7 illustrates a block diagram of a communication architecture 700. The communication architecture 700 can implement various embodiments described herein. As shown in FIG. 7, the communication architecture 700 comprises one or more clients 702 and servers 704. One of the clients 702 and/or one of the servers 704 can represent any constituent component of the mesh network 100.

The client 702 and the server 704 can be operatively connected to a client data store 708 and a server data store 710, respectively, that can be employed to store information local to the respective client 702 and server 704. In various embodiments, the client 702 and/or the server 704 can implement one or more of logic flows or operations described herein.

The client 702 and the server 704 can communicate data or other information between each other using a communication framework 706. The communications framework 706 can implement any known communications technique or protocol. The communications framework 706 can be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators), or any combination thereof. The communications framework 706 can operate over any communication media according to any networking technology including any wired or wireless communications standard or protocol, or any combination thereof.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, novel subject matter lies in less than all features of a single disclosed embodiment. Thus, the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   accessing, by processing circuit, a set of credit risk assessment data samples from a data store;
   generating, by the processing circuit, local attributions for the set of credit risk assessment data samples;
   comparing, by the processing circuit, a pair of local attributions, and assigning a rank distance thereto;
   generating clusters of the local attributions, each cluster having a medoid;
   generating, by the processing circuit, global attributions, wherein each global attribution corresponds to the medoid of one of the clusters; and
   determining, by the processing circuit, a bias in a neural network, one or more features to include in the neural network, or a combination thereof based on the global attributions.

2. The computer-implemented method of claim 1, further comprising normalizing, by the processing circuit, each local attribution.

3. The computer-implemented method of claim 2, wherein the local attributions are represented by vectors, and each vector corresponds with a particular local attribution, and each local attribution is normalized by normalizing each of the vectors; and
   wherein the rank distance assigned to the pair of local attributions is proportional to a degree of ranking differences between the pair of local attributions as normalized.

4. The computer-implemented method of claim 3, wherein comparing the pair of local assessment attributes comprises comparing normalized vectors associated with the pair of local attributions.

5. The computer-implemented method of claim 1, wherein generating the global attributions includes applying, by the processing circuit, a clustering algorithm to generate the global attributions, the clustering algorithm being a K-medoids clustering algorithm.

6. The computer-implemented method of claim 5, wherein the K-medoids clustering algorithm utilizes the rank distance for the pair of normalized local attributions to assign each local attribution to one of one or more clusters.

7. The computer-implemented method of claim 1, wherein assigning the rank distance is performed by the processing circuit calculating the rank distance using a weighted Kendall's Tau rank distance algorithm or using a weighted Spearman's Rho squared rank distance algorithm.

8. A system comprising:
a memory to store a set of credit risk assessment data samples;
a processing circuit in communication with the memory to:
access the set of credit risk assessment data samples from the memory;
generate local attributions for the set of credit risk assessment data samples;
compare a pair of local attributions, and assigning a rank distance thereto;
generate clusters of the local attributions, each cluster having a medoid;
generate global attributions, wherein each global attribution corresponds to the medoid of one of the clusters; and
determine a bias in a neural network, one or more features to include in the neural network, or a combination thereof based on the global attributions.

9. The system of claim 8, wherein the processing circuit is further to normalize each local attribution.

10. The system of claim 9, wherein the local attributions are represented by vectors, and each vector corresponds with a particular local attribution, and the system to normalize each of the vectors to thereby normalize each local attribution; and
wherein the rank distance assigned to the pair of local attributions is proportional to a degree of ranking differences between the pair of local attributions as normalized.

11. The system of claim 10, wherein the processing circuit to compare the pair of local assessment attributes comprises the processing circuit to compare normalized vectors associated with the pair of local attributions.

12. The system of claim 8, wherein the processing circuit to generate the global attributions includes the processing circuit to apply a clustering algorithm to generate the global attributions, the clustering algorithm being a K-medoids clustering algorithm.

13. The system of claim 12, wherein the K-medoids clustering algorithm utilizes the rank distance for the pair of normalized local attributions to assign each local attribution to one of one or more clusters.

14. The system of claim 8, wherein the processing circuit to assign the rank distance includes the processing circuit to calculate the rank distance using a weighted Kendall's Tau rank distance algorithm or using a weighted Spearman's Rho squared rank distance algorithm.

15. A non-transitory computer-readable storage medium comprising executable instructions stored thereon, which when executed by a processing circuit, cause the processing circuit to:
access a set of credit risk assessment data samples from a data store;
generate local attributions for the set of credit risk assessment data samples;
compare a pair of local attributions, and assigning a rank distance thereto;
generate clusters of the local attributions, each cluster having a medoid;
generate global attributions, wherein each global attribution corresponds to the medoid of one of the clusters; and
determine a bias in a neural network, one or more features to include in the neural network, or a combination thereof based on the global attributions.

16. The non-transitory computer-readable storage medium of claim 15, further comprising the processing circuit to normalize each local attribution.

17. The non-transitory computer-readable storage medium of claim 16, wherein the local attributions are represented by vectors, and each vector corresponds with a particular local attribution, and the processing circuit to normalize each of the vectors to thereby normalize each local attribution; and
wherein the rank distance assigned to the pair of local attributions is proportional to a degree of ranking differences between the pair of local attributions as normalized.

18. The non-transitory computer-readable storage medium of claim 17, wherein the processing circuit to compare the pair of local assessment attributes comprises the processing circuit further to compare normalized vectors associated with the pair of local attributions.

19. The non-transitory computer-readable storage medium of claim 15, wherein the processing circuit to generate the global attributions includes the processing circuit to apply a clustering algorithm to generate the global attributions, the clustering algorithm being a K-medoids clustering algorithm; and
wherein the K-medoids clustering algorithm utilizes the rank distance for the pair of normalized local attributions to assign each local attribution to one of one or more clusters.

20. The non-transitory computer-readable storage medium of claim 15, wherein the processing circuit to assign the rank distance includes the processing circuit to calculate the rank distance using a weighted Kendall's Tau rank distance algorithm or using a weighted Spearman's Rho squared rank distance algorithm.

* * * * *